United States Patent
Dan-Jumbo et al.

(10) Patent No.: US 8,409,384 B2
(45) Date of Patent: *Apr. 2, 2013

(54) PREDICTABLE BONDED REWORK OF COMPOSITE STRUCTURES

(75) Inventors: Eugene A. Dan-Jumbo, Bothell, WA (US); Russell L. Keller, Maple Valley, WA (US); Everett A. Westerman, Auburn, WA (US)

(73) Assignee: The Boeing Company, Chicago, IL (US)

( * ) Notice: Subject to any disclaimer, the term of this patent is extended or adjusted under 35 U.S.C. 154(b) by 589 days.

This patent is subject to a terminal disclaimer.

(21) Appl. No.: 12/400,475

(22) Filed: Mar. 9, 2009

(65) Prior Publication Data

US 2010/0227105 A1 Sep. 9, 2010

(51) Int. Cl.
*B23C 3/16* (2006.01)
(52) U.S. Cl. ............ 156/94; 156/98; 428/63; 428/64.1; 428/212; 428/214; 428/218
(58) Field of Classification Search ............ 156/94, 156/98; 428/63, 64.1, 212, 214, 217, 218
See application file for complete search history.

(56) References Cited

U.S. PATENT DOCUMENTS

| | | | |
|---|---|---|---|
| 3,995,080 A | 11/1976 | Cogburn et al. | |
| 4,588,853 A | 5/1986 | Confer | |
| 4,808,253 A | 2/1989 | Mimbs | |
| 4,961,799 A | 10/1990 | Cologna et al. | |
| 4,978,404 A | 12/1990 | Westerman, Jr. | |
| 5,190,611 A | 3/1993 | Cologna et al. | |
| 5,207,541 A * | 5/1993 | Westerman et al. | 409/179 |
| 5,214,307 A | 5/1993 | Davis | |
| 5,232,962 A | 8/1993 | Dershem et al. | |
| 5,344,515 A | 9/1994 | Chenock, Jr. | |
| 5,626,934 A * | 5/1997 | Brewer | 428/63 |
| 5,709,469 A | 1/1998 | White et al. | |
| 6,265,333 B1 | 7/2001 | Dzenis et al. | |
| 6,468,372 B2 | 10/2002 | Kociemba et al. | |
| 6,472,758 B1 | 10/2002 | Glenn et al. | |
| 6,680,099 B1 | 1/2004 | Brewer | |
| 7,325,771 B2 | 2/2008 | Stulc et al. | |
| 7,628,879 B2 | 12/2009 | Ackerman | |
| 7,935,205 B2 | 5/2011 | Bogue et al. | |

(Continued)

FOREIGN PATENT DOCUMENTS

| | | |
|---|---|---|
| EP | 1775445 A2 | 4/2007 |
| EP | 1972429 A2 | 9/2008 |

(Continued)

OTHER PUBLICATIONS

Baker, "Repair Techniques for Composite Structures", Composite Materials in Aircraft Structures, Chapter 13, Jan. 1990, pp. 207-227.

(Continued)

*Primary Examiner* — Jeff Aftergut
*Assistant Examiner* — Jaeyun Lee
(74) *Attorney, Agent, or Firm* — Yee & Associates, P.C.

(57) ABSTRACT

A patch for reworking an inconsistent area of a composite structure comprises a composite laminate patch and a bond joint between the patch and the structure. The bond joint including at least first and second regions respectively having differing properties for releasing strain energy around the inconsistent area at different rates.

19 Claims, 8 Drawing Sheets

U.S. PATENT DOCUMENTS

| | | | |
|---|---|---|---|
| 8,263,212 | B2 | 9/2012 | Care |
| 2006/0029807 | A1 | 2/2006 | Peck |
| 2006/0243860 | A1 | 11/2006 | Kismarton |
| 2010/0047541 | A1 | 2/2010 | Care |
| 2010/0227106 | A1* | 9/2010 | Dan-Jumbo et al. ......... 428/64.1 |
| 2010/0227117 | A1 | 9/2010 | Dan-Jumbo et al. |
| 2010/0233424 | A1 | 9/2010 | Dan-Jumbo et al. |

FOREIGN PATENT DOCUMENTS

| | | |
|---|---|---|
| WO | 2010104676 A1 | 9/2010 |
| WO | 2010104741 A1 | 9/2010 |
| WO | 2010104745 A1 | 9/2010 |
| WO | 2010104746 A1 | 9/2010 |

OTHER PUBLICATIONS

Prieto, "Modelling and Analysis of Crack Turning on Aeronautical Structures", Doctoral Thesis, Apr. 2007, 25 Pages, accessed May 29, 2012 http://www.tesisenred.net/bitstream/handle/10803/6055/06Llllp06de10.pdf?sequence=6.

Tomblin et al., "Assessment of Industry Practices for Aircraft Bonded Joints and Structures," U.S. Department of Transportation, Federal Aviation Administration, DOT/FAA/AR-05/13, Jul. 2005, 245 Pages, accessed May 29, 2012 http://www.tc.faa.gov/its/worldpac/techrpt/ar0513.pdf.

"Damage-tolerance evaluation of structure," Federal Aviation Regulations, Part 25, Section 571(e), Apr. 1998, 3 Pages, accessed May 29, 2012 http://www.flightsimaviation.com/data/FARS/par_25-571.html.

PCT Search Report dated Jun. 29, 2010 regarding 08-1011, application No. PCT/US2010/026252, applicant The Boeing Company, 3 pages.

PCT Search Report dated May 21, 2010 regarding 08-0999PCT, application No. PCT/US2010/026229, applicant The Boeing Company, 3 pages.

USPTO Office Action dated Jan. 5, 2012 for U.S. Appl. No. 12/400,519, 21 pages.

USPTO Final Office Action dated Dec. 16, 2011 for U.S. Appl. No. 12/401,541, 10 pages.

USPTO Office Action dated Jul. 14, 2011 for U.S. Appl. No. 12/401,541, 13 pages.

USPTO non-final office action dated Feb. 1, 2012 regarding U.S. Appl. No. 12/400,561, 13 Pages.

Response to office action dated May 1, 2012 regarding U.S. Appl. No. 12/400,561, 29 Pages.

PCT search report dated Jun. 29, 2010 regarding application PCT/US2010/026256, filed date Mar. 4, 2010, applicant reference 08-1102-PCT, applicant The Boeing Company, 7 Pages.

Dan-Jumbo et al., "Bonded Patch Having Multiple Zones of Fracture Toughness," U.S. Appl. No. 12/706,799, filing date Feb. 17, 2010, 47 Pages.

Dan-Jumbo et al., "Discretely Tailored Multi-Zone Bondline for Fail-Safe Structural Repair," U.S. Appl. No. 12/903,489, filing date Oct. 13, 2010, 43 Pages.

Wang et al., "Optimum Shapes for Minimising Bond Stress in Scarf Repairs," 5th Australian Congress on Applied Mechanics, ACAM 2007, Dec. 2007, 6 Pages.

Gacoin et al., "Comparison between experimental and numerical study of the adhesively bonded scarf joint and double scarf joint: Influence of internal singularity created by geometry of the double scarf joint on the damage evolution," International Journal of Adhesion & Adhesives, vol. 29, Feb. 2009, pp. 572-579.

Harman et al., "Improved design methods for scarf repairs to highly strained composite aircraft structure," Composite Structures, vol. 75, Issues 1-4, Sep. 2006, pp. 132-144.

Kelly, "Composite Structure Repair," AGARD Report No. 716, 57th Meeting of the Structures and Materials Panel, Oct. 1983, 26 Pages.

Kan et al., "Advanced Certification Methodology for Composite Structures," U.S. Department of Transportation, Federal Aviation Administration, DOT/FAA/AR-96/111, Apr. 1997, 167 Pages, accessed May 29, 2012 http://www.dtic.mil/cgi-bin/GetTRDoc?AD=ADA326762.

Komoroski et al., "Stacking Sequence Effects and Delamination Growth in Graphite/Epoxy Laminates Under Compression-Dominated Fatigue Loading," Composite Materials: Fatigue and Fracture—Fifth Volume, editor Roderick Martin, Oct. 1995, pp. 249-267 (abstract).

Berthelot, "Composite Materials: Mechanical Behavior and Structural Analysis," (translated by Cole) published by Springer, 1st edition, Dec. 1998, 701 Pages (abstract).

Search Report for PCT US2010/025181 submitted on Jul. 23, 2010.

Notice of allowance dated Oct. 18, 2012 regarding U.S. Appl. No. 12/400,519, 20 pages.

Office action dated Nov. 9, 2012 regarding U.S. Appl. No. 12/903,489, 29 pages.

Office Action dated Jan. 2, 2013, regarding USPTO U.S. Appl. No. 12/706,799, 33 pages.

Mouritz, "Review of z-pinned composite laminates," Composites Part A: Applied Science and Manufacturing, vol. 38, No. 12, Dec. 2007, pp. 2383-2397.

Tomblin et al., "Bonded Repair of Aircraft Composite Sandwich Structures," U.S. Department of Transportation Final Report No. DOT/FAA/AR-03/74, Feb. 2004, 121 pages.

Chang et al., "Properties and failure mechanisms of z-pinned laminates in monotonic and cyclic tension," Composites Part A: Applied Science and Manufacturing, vol. 37, No. 10, Oct. 2006, pp. 1501-1513.

Chang, "A Study on Fracture Toughness of Advanced Structural Composites," Naval Air Development Center Report No. EW-4-73, Jul. 1973, 113 pages.

Final Office Action, dated Dec. 14, 2012, regarding USPTO U.S. Appl. No. 12/401,541, 13 pages.

\* cited by examiner

| Section | | | Kit Number | | |
|---|---|---|---|---|---|
| | | | Model 787-3 | Model 747-8 | Model 787-9 |
| Primary Structure | | | | | |
| | Door - Forward | | 787-3-1 | 787-8-1 | 787-9-1 |
| | Door - Aft | | 787-3-2 | 787-8-2 | 787-9-2 |
| | Fuselage | Sections 1-4 | 787-3-3a | 787-8-3a | 787-9-3a |
| | | Sections 5-8 | 787-3-3b | 787-8-3b | 787-9-3b |
| | Hatch - Forward | | 787-3-4 | 787-8-4 | 787-9-4 |
| | Hatch - Aft | | 787-3-5 | 787-8-5 | 787-9-5 |
| | Wing - Left | | 787-3-6 | 787-8-6 | 787-9-6 |
| | Wing - Right | | 787-3-7 | 787-8-7 | 787-9-7 |
| | Vert Stabilizer | | 787-3-8 | 787-8-8 | 787-9-8 |
| | Horz Stabilizer - Left | | 787-3-9 | 787-8-9 | 787-9-9 |
| | Horz Stabilizer - Right | | 787-3-10 | 787-8-10 | 787-9-10 |
| Secondary Structure | | | | | |
| | Vert Stabilizer | | 787-3-11 | 787-8-11 | 787-9-11 |
| | Faring - Wing to Fuselage | | 787-3-12 | 787-8-12 | 787-9-12 |
| | Wing Flaps | | 787-3-13 | 787-8-13 | 787-9-13 |

FIG. 12

PREDICTABLE BONDED REWORK OF COMPOSITE STRUCTURES

CROSS REFERENCE TO RELATED APPLICATIONS

This application is related to co-pending U.S. patent application Ser. No. 12/400,519, filed on Mar. 9, 2009, and Ser. No. 12/400,561, filed on Mar. 9, 2009, both of which applications are filed concurrently herewith on and are incorporated by reference herein in their entireties.

TECHNICAL FIELD

This disclosure generally relates to composite structures, and deals more particularly with a method and composite patch for reworking areas of composite structures containing inconsistencies.

BACKGROUND

Composite structures sometimes have localized areas containing one or more inconsistencies that may require rework in order to bring the structure within design tolerances.

In the past, one rework process was performed using a patch that was placed over the inconsistent area and secured to the parent structure using mechanical fasteners. This rework technique was desirable because the condition of the patch could be monitored over time by visually inspecting the fasteners. However, the use of fasteners may increase aircraft weight and/or drag on the aircraft, and may be esthetically undesirable in some applications.

In some applications, rework patches have been secured to a parent structure using a bonded joint, however this technique may also require the use of mechanical fasteners that provide secondary load paths forming an arrestment mechanism to limit the growth of an inconsistency. Furthermore, changes in a bonded joint securing a rework patch on a parent structure may not be easily monitored over time because the attaching mechanism of the joint or joint interface may not be visible.

Accordingly, there is a need for a rework patch and method of reworking inconsistent areas of composite structures, while allowing the condition of the reworked area to be monitored over time using visual or other types of non-destructive inspection techniques.

SUMMARY

The disclosed embodiments provide a rework patch and method of reworking composite structures using a bonded rework patch without the need for mechanical fasteners. The rework patch includes features that allow visual inspection of the condition of the reworked area over time and permit reliable prediction of future bond joint changes. Because the condition of the reworked area may be visually inspected and predictions made about future bond condition, the bonded rework patch and visual inspection technique may allow certification of the rework by aircraft certifying authorities.

According to one disclosed embodiment, a patch is provided for reworking an area of a composite structure containing an inconsistency. The rework patch includes a composite laminate patch and a bonded joint between the laminate patch and the composite structure. The bonded joint includes at least first and second regions respectively having differing material properties for releasing strain energy around the inconsistent area at different rates. In one example, the second region substantially surrounds the first region and the first region releases strain energy in the inconsistent area at a rate greater than the second region. The bonded joint may include first and second adhesive sections respectively having material properties tailored to release the strain energy at differing rates. The tailored material properties of the first and second adhesive sections may include at least one of thickness, fracture toughness, peel strength and shear strength.

According to a disclosed method embodiment, an inconsistent area on a composite structure may be reworked by forming a composite laminate patch and placing the laminate patch over the inconsistent area. A bond joint is formed between the laminate patch and the composite structure. The bond joint is divided into at least two regions that release strain energy surrounding the inconsistent area respectively at different rates. Forming the composite laminate patch may include laying up multiple plies of a fiber reinforced polymer and tailoring characteristics of the plies in areas of the laminate patch that overlie the regions of the bond joint.

According to another method embodiment, inconsistent areas of a composite aircraft structure may be reworked by selecting a plurality of sections on the composite aircraft structure that may have inconsistent areas requiring structural rework. At least one rework kit is formed for each of the selected sections, including fabricating a composite laminate patch and fabricating an adhesive layer used to bond the patch to the aircraft structure. After identifying an inconsistent area on the aircraft structure requiring rework, one of the kits is selected based on the section containing the identified inconsistent area. The selected kit is then used to rework the inconsistent area.

The disclosed embodiments satisfy the need for a bonded composite rework patch and method of rework that allow rework of an inconsistent area in a composite structure, in which the condition of the rework can be visually monitored, and any change of the bonded joint may be predicted based on the visual inspection.

BRIEF DESCRIPTION OF THE ILLUSTRATIONS

FIG. 12 is an illustration of a table showing use of part numbers to associate rework kits with various sections of the aircraft shown in FIG. 11.

DETAILED DESCRIPTION

Figure 1:
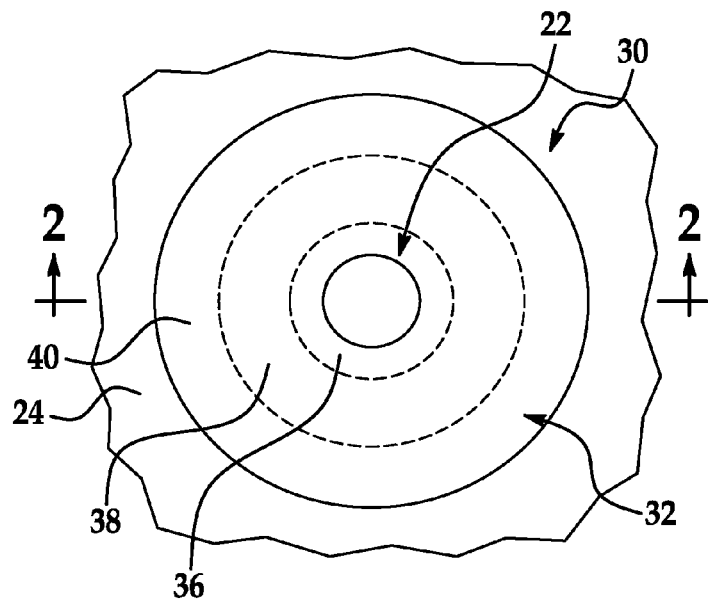
FIG. 1 is an illustration of a bonded rework patch on a composite structure.
Figure 2:
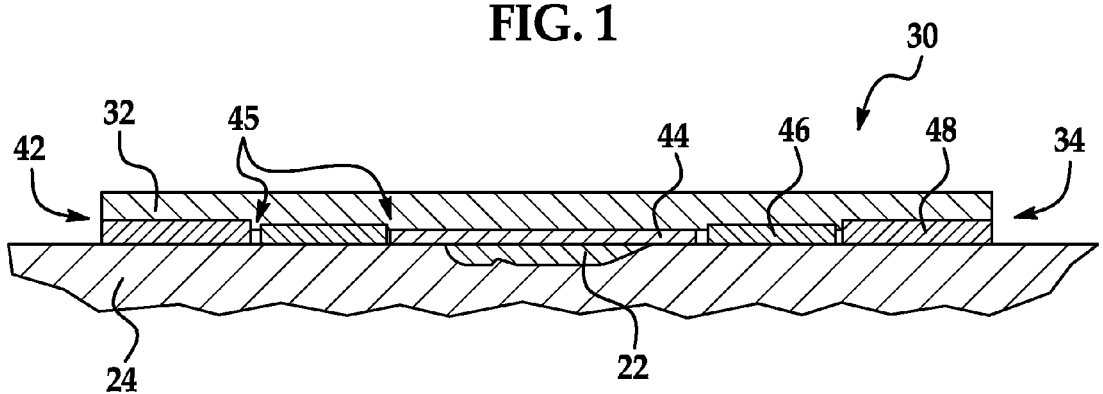
FIG. 2 is an illustration of a sectional view taken along the line 2-2 in FIG. 2.

Referring now to FIGS. 1 and 2, according to the disclosed embodiments, a composite rework patch 30 is used to rework an inconsistent area 22 in a composite structure 24. As used herein, "inconsistent area", "inconsistency" and "inconsistencies" each refer to a localized area in the composite structure 24 that may be outside of designed tolerances. The inconsistency 22 may comprise, for example and without limitation, a void, a dent, or a porosity that may occur at the time that the composite structure 24 is manufactured, or later during the service life of the composite structure 24.

The composite rework patch 30 comprises a laminate layer 32 which overlies the inconsistent area 22 and is bonded to the composite structure 24 by a layer 34 of a structural adhesive forming a bond joint 42. The size of the composite rework patch 30 may vary with the application and the dimensions of the inconsistent area 22. The adhesive layer 34 divides the bond joint 42 and inconsistent area 22 into first, second and third control regions 36, 38, 40 respectively, that may provide a graceful reduction of transition loads transmitted between the composite structure 24 and the composite rework patch 30. The first control region 36 is centrally located over the inconsistent area 22, and the second and third control regions 38, 40 may respectively comprise a pair of substantially concentric rings surrounding the centrally located first control region 36. While the control regions 36, 38, 40 are shown as being generally circular in the disclosed embodiment, a variety of other shapes are possible. Also, in other embodiments, the composite rework patch 30 may have only two control regions 36, 38, or may have more than three control regions 36, 38, 40.

The first control region 36 may exhibit favorable in-plane adhesive stresses. The second control region 38 may be referred to as a durability region and any disbond within this region between the laminate layer 32 and the composite structure 24 may need to be evaluated and quantified in order to determine whether rework should be performed. The third control region 40, which may be dominated by in-plane shear and peeling moments, may affect the behavior of the entire structural bond between the laminate layer 32 and composite structure 24.

Figure 3:
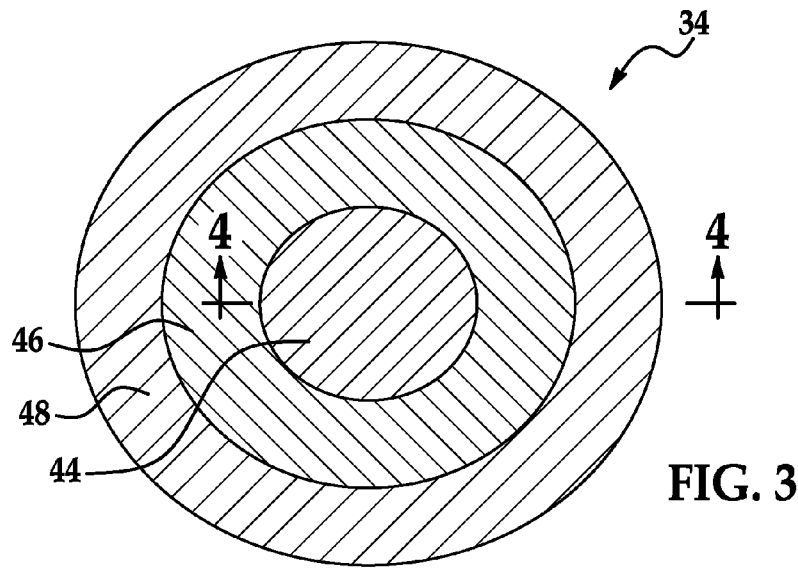
FIG. 3 is an illustration of a plan view of the adhesive layer shown in FIG. 2.
Figure 3A:
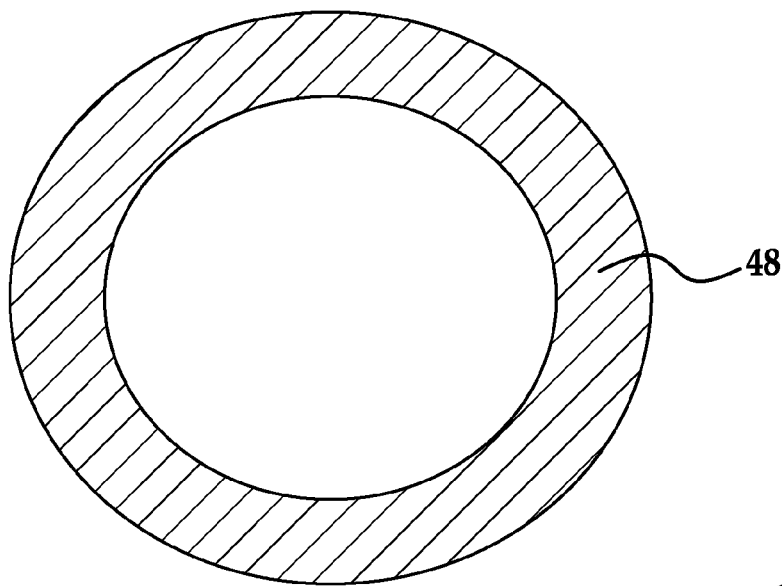
FIGS. 3a-3c are illustrations of plan views respectively of sections of the adhesive layer shown in FIG. 3.
Figure 3B:
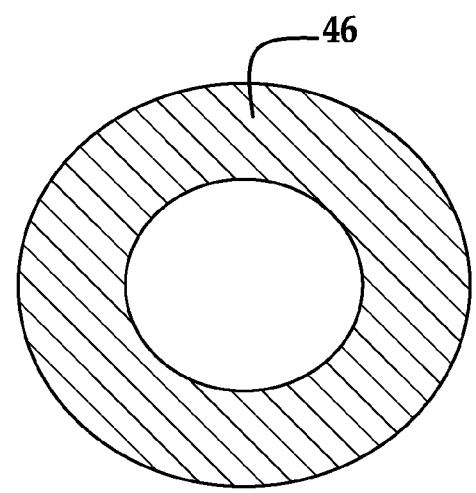
Figure 3C:
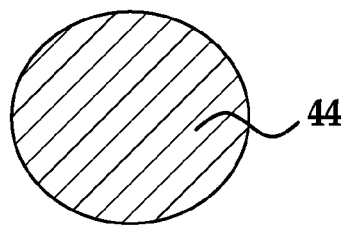
Figure 4:
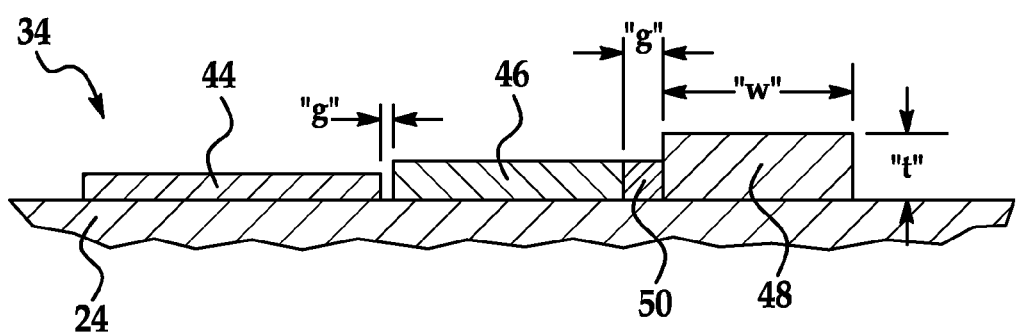
FIG. 4 is an illustration of a sectional view taken along the line 4-4 in FIG. 3.

Referring now particularly to FIGS. 2-4, the adhesive layer 34 may comprise a central first adhesive section 44 surrounded by concentric ring shaped adhesive sections 46 and 48. The size and shape of the adhesive sections 44, 46, 48 generally correspond to the first, second and third control regions 36, 38, 40 respectively of the v rework patch 30. Each of the adhesive sections 44, 46, 48 may comprise one or more plies of a commercially available structural adhesive which is generally available in film or sheet form that may be cut to the desired shape. The adhesive sections 44, 46, 48 may also be formed from a commercially available structural adhesive paste. As previously noted, multiple plies (not shown) of the adhesive sheet material may be built up to form a desired thickness "t" for each of the adhesive sections 44, 46, 48. The strength of the bond may be tailored using the thickness "t" between laminate layer 32 and composite structure 24. In some applications only a single ply of adhesive sheet material may be required, while in other applications, more than one ply may be necessary, depending on the application and the thickness of the adhesive sheet.

In one embodiment, circumferential gaps "g" may be formed between adhesive sections 44, 46, 48 to aid in arresting the growth of potential debonding between the laminate layer 32 and the composite structure 24. A filler 50 may be placed in one or both of the gaps "g" to aid in the arrestment.

The properties of each of the adhesive sections 44, 46, 48 may be tailored in a manner that affects the rate at which first, second and third control regions 36, 38, 40 of the bond joint 42 respectively release strain energy. Tailoring of each of the adhesive sections 44, 46, 48 may be achieved by altering the dimensions of the adhesive sections 44, 46, 48, such as thickness "t" or width "w", or by altering the form of the film, paste, scrim, etc., as well as by altering the structural properties of the adhesive layer, such as fracture toughness, peel or shear properties, or by providing the gap "g" between the adhesive sections 44, 46, 48. Fracture toughness may be described as the general resistance of a material to delaminate. Additionally, a spacer or filler 50 may be interposed between adhesive sections 44, 46, 48 to aid in arresting disbond growth.

The use of the tailored adhesive sections 44, 46, 48 may result in a bonded composite rework patch 30 that is divided into multiple control regions 36, 38, 40 that release strain energy at different rates. The first, second, and third control regions 36, 38, 40 provide for a graceful reduction of transition loads between the laminate layer 32 and the composite structure 24, which may not only allow prediction of a course of disbond extension, but can allow assessment of the condition of the composite rework patch 30 through simple visual inspection, or other non-destructive inspection techniques. Although three control regions 36, 38, 40 are shown and discussed, more or less than three control regions may be possible.

The first control region 36 of the composite rework patch 30 which overlies the inconsistent area 22 exhibits favorable in-plane stresses that may suppress the stress concentration around the boundary of a disbond of the bond joint 42. The global adhesive stresses within the first control region 36 may reduce the strain energy release rate necessary for extension of a disbond under maximum load limits applied to the composite structure 24.

The characteristics of the composite rework patch 30 within the second control region 38 may result in the release of strain energy at a rate greater than that of the first control region 36. Any disbond that may occur in the bond joint 42 within the second control region 38 may be anticipated by a fatigue durability disbond curve (not shown) which defines the work input required to initiate disbond growth. The characteristics of the third control region 40 are selected such that the strain energy release rate within the third control region 40 is greater than that of the second control region 38 to discourage disbond initiation and growth, as well as in-plane shear and peeling moments.

Figure 5:
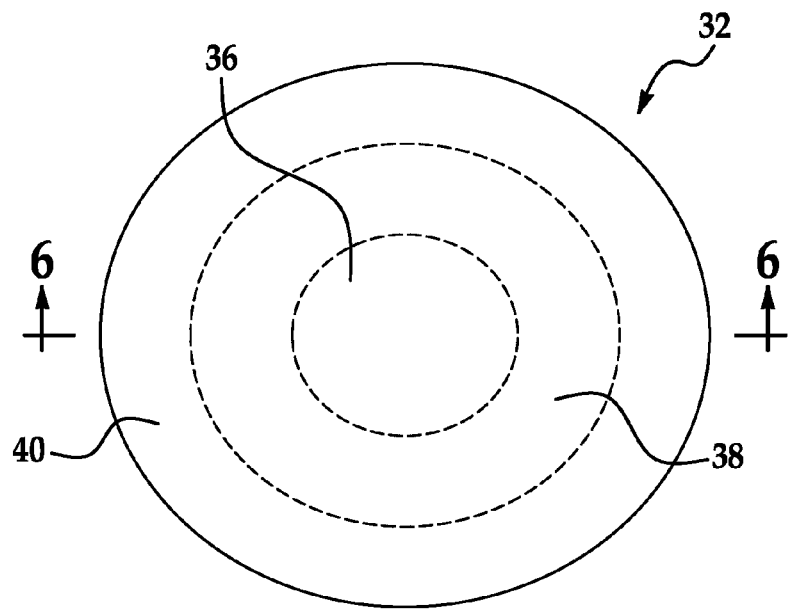
FIG. 5 is an illustration of a plan view of a composite laminate patch forming part of the rework patch shown in FIG. 1.
Figure 6:
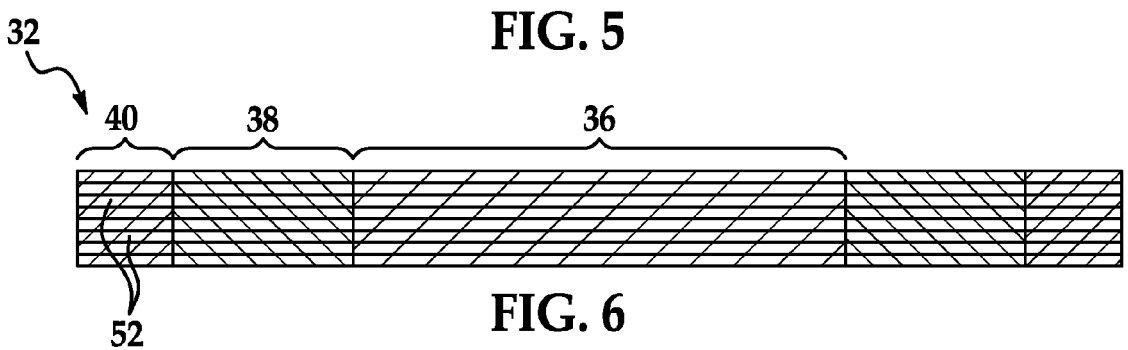
FIG. 6 is an illustration of a sectional view taken along the line 6-6 in FIG. 5.

Attention is now directed to FIGS. 5 and 6 which illustrate a laminate layer 32 comprising multiple plies 52 of fiber reinforced polymer in which the plies 52 may be tailored in order to aid in achieving first, second and third control regions 36, 38, 40 respectively, having the desired strain energy release rates. Strain energy release rate within the laminate layer 32 may be tailored within the control regions 36, 38, 40 by selecting and/or arranging the plies such that the plies in each of the control regions 36, 38, 40 have different characteristics. In other words, each of the control regions 36, 38, 40 may have ply characteristics that are unique to that region. Thus, for example, the plies in the second control region 38 may have characteristics that are different from those in control regions 36 or 40, and the plies in control region 36 may have characteristics that are different than those in control regions 38 and 40. As used herein, "characteristics" and "ply characteristics" refer to, without limitation: the type, size or quantity of fiber reinforcement in a ply; ply thickness; gaps between the plies; materials, elements or structures placed between the plies; the number of plies; the type or density of matrix used in the ply; the layup orientation (angle) of each ply and/or the sequence of ply orientations in a stack of the plies.

The strain energy release rate within one of more of the control regions 36, 38, 40 may be tailored by forming a scarf or tapered joint (not shown) between the laminate layer 32 and the composite structure 24. The strain energy release rate may also be tailored by providing gaps (not shown) in certain areas between plies 52 in a manner that may alter the mechanical properties of the laminate layer 32 in each of the control regions 36, 38, 40. Also, it may be possible to employ differing orientation sequences of the plies 52 in order to aid in achieving the defined control regions 36, 38, 40. Orientation refers to the layup angle or direction of reinforcing fibers in a ply, for example and without limitation, 0°, 30°, 60°, 90° and/or 0°, +45°, −45°, 90°.

In the example illustrated in FIGS. 5 and 6, the materials used in the plies 52 and/or the orientation sequences within the first control region 36 result in the highest rate of strain relief, while the selection of these materials and/or ply orientation sequences in second and third control regions 38 and 40 respectively result in intermediate and lowest rates of release of strain energy, respectively. In other embodiments, however, depending on the application, the third control region 40 may possess highest rate of strain energy relief, while the first control region 36 posses the lowest rate of strain energy relief.

Figure 7:
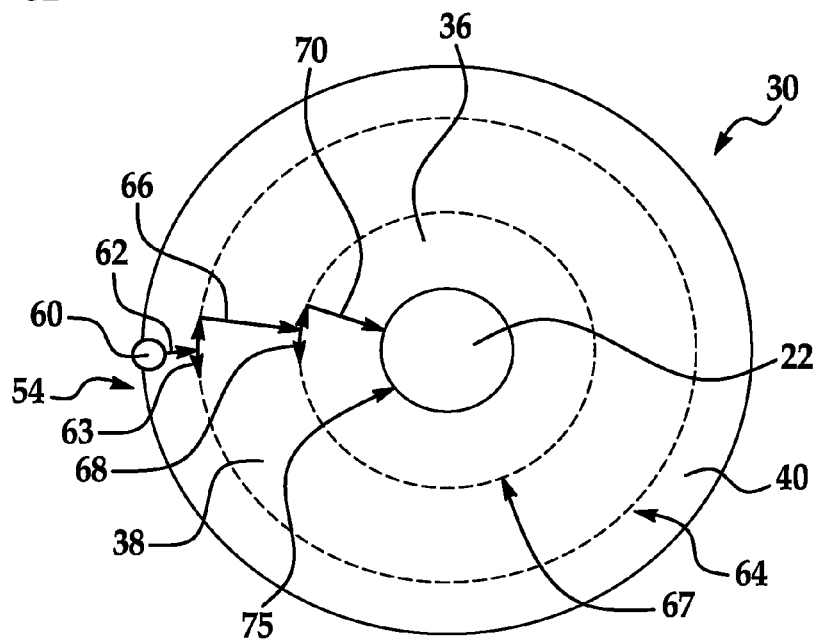
FIG. 7 is an illustration of a plan view of the rework patch shown in FIG. 1, and illustrating a typical propagation path of a debonding.

FIG. 7 illustrates the manner in which a disbond beginning at outer edge 60 of the third control region 40 and growing inwardly, may be arrested. The disbond beginning at edge 60 may be illustrated in this scenario as growing directly inward, as shown at 62 until the boundary 64 is reached between control regions 38 and 40. As a result of the difference in materials in control regions 36, 38, 40, and/or the presence of a gap "g" or filler 50 (FIG. 5), and/or the difference in the adhesive properties of the sections 44, 46, 48 of the adhesive layer 34 (FIG. 2), the disbond is arrested and may move circumferentially around 63 the boundary 64 of the third control region 40. Another scenario may have a disbond progressing from the third region 40 and into the second control region 38, and progressing inwardly toward the first control region 36, as indicated by the numeral 66. When the progression of the disbond reaches the boundary 68 between control regions 36 and 38, it is arrested and may move circumferentially around the boundary 68.

Figure 8:
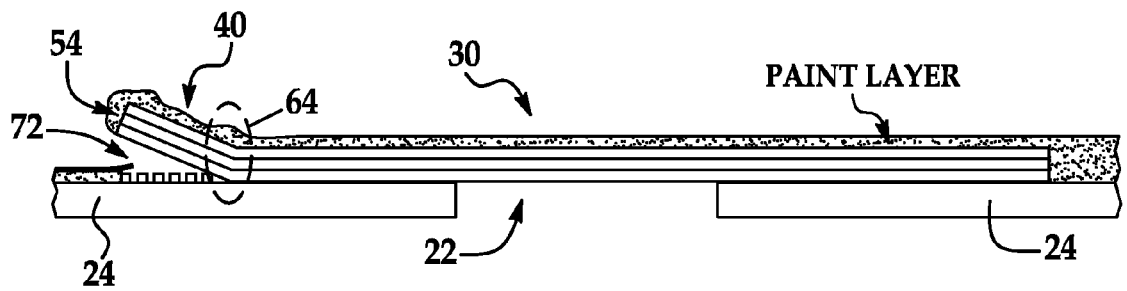
FIGS. 8-10 are illustrations of sectional views showing progression of the debonding through regions of the patch.

Referring concurrently to FIGS. 7 and 8, as the disbond 72 moves inwardly from the beginning point 60, the outer edge 54 of the rework patch may peel upwardly thereby cracking overlying paint (not shown) which provides a visual indication of disbond initiation and/or growth within the third control region 40. This visual indication of a disbond may terminate at the boundary 64 between control regions 38 and 40.

Figure 9:
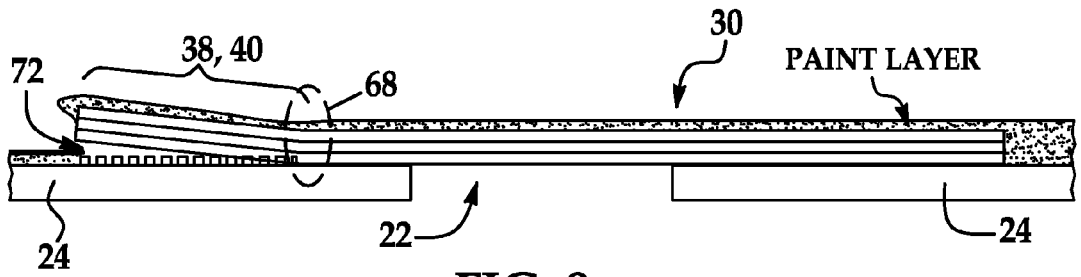
Figure 10:
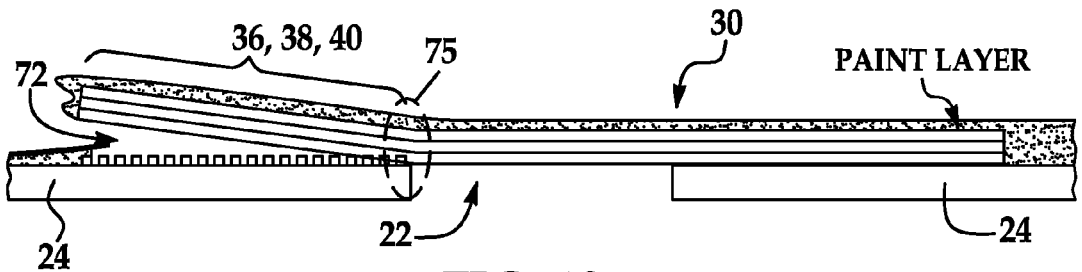

As shown in FIG. 9, if the disbond 72 continues into the second control region 40 toward the boundary 68, the composite rework patch 30 in the area of the control regions 38 and 40 may peel upwardly, thereby further cracking overlying paint to provide a visual indication that the disbond has progressed into or through the second control region 38. FIG. 10 illustrates the disbond having progressed up to the inconsistent area 22 of inconsistency. At this point, the areas of the composite rework patch 30 and all three control regions 36, 38, 40 may peel upwardly to further crack overlying paint, thereby providing a still more obvious visual indication that the disbond has advanced to a point where the composite rework patch 30 may need further attention. From the foregoing, it is apparent that the control regions 36, 38, 40 of the composite rework patch 30 provide a means of allowing nondestructive, visual inspection of the condition of the composite rework patch 30, including the bond joint 42 between the patch 30 and the composite structure 24.

Figure 11:
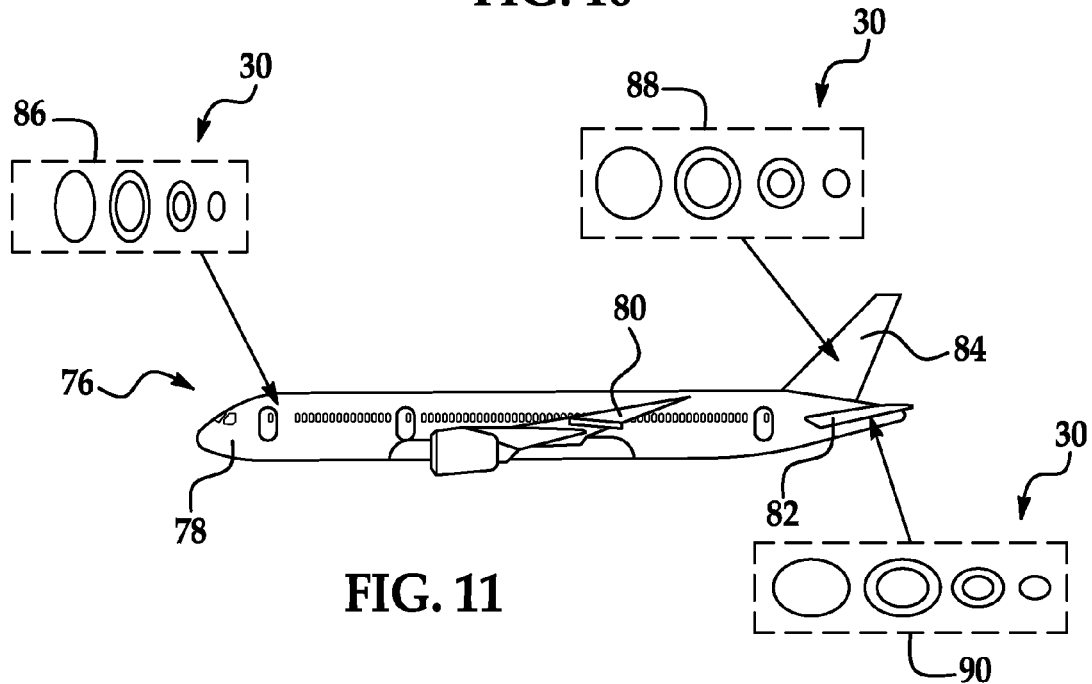
FIG. 11 is an illustration of a diagram showing the use of rework kits to rework various sections of a composite aircraft.

Referring now to FIGS. 11 and 12, composite rework patches 30 may be preassembled as kits 86, 88, 90 which may be used to rework various sections of a composite structure, including but not limited to skin rework. For example, as shown in FIG. 11, an airplane 76 may have multiple sections, such as a fuselage 78, wings 80, horizontal stabilizers 82 and vertical stabilizer 84 formed of composite materials that may develop inconsistencies requiring rework. Differing types of rework kits 86, 88, 90 may be required to rework differing ones of the sections 92 because the sections 92 may have different structural geometries, load carrying requirements etc. According to a disclosed embodiment, kits 86, 88, 90 may be individually tailored to make reworks in a corresponding section 78-84 of the aircraft 76. FIG. 12 illustrates a manner in which kits may be respectively associated with reworks to be performed within particular sections 92 of the aircraft 76. For example, the sections 92 of the aircraft 76 may be divided into primary structures 96 and secondary structures 98. One example of a primary structure is a fuselage 104 which may contain multiple sections 105. The kits 86-90 may be fabricated and assembled to make reworks within each of the designated sections 92. Kit or part numbers 102 may be assigned for use in a particular section 92 of the aircraft 76, as well as for different model numbers 100 of the same type of aircraft 76.

Figure 13:
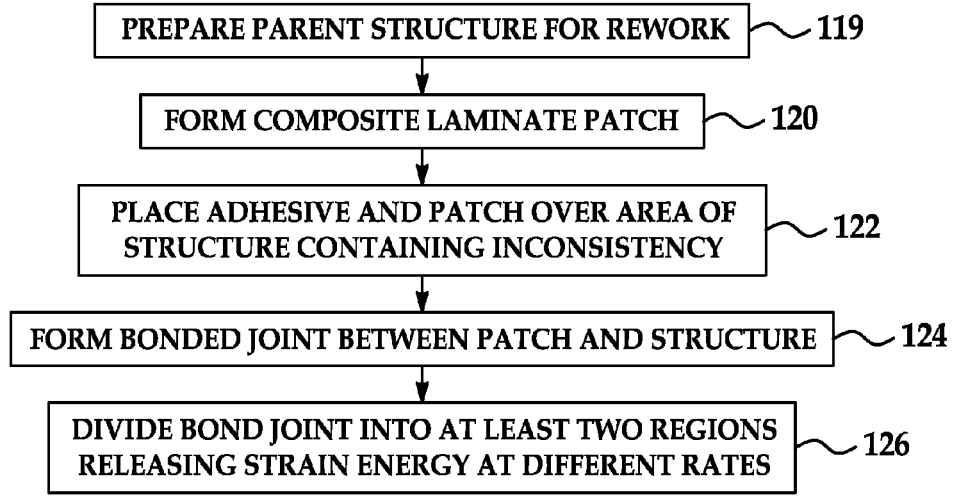
FIG. 13 is an illustration of a flow diagram of a method for reworking an inconsistent area of a composite structure.

FIG. 13 broadly illustrates a method of reworking an inconsistent area of a composite structure. Beginning at 119, the composite structure 24 may be prepared for the rework procedure, by for example and without limitation, trimming the inconsistent area 22 to be reworked. This trimming operation may include scarfing or tapering the edges (not shown) of the composite structure 24 surrounding inconsistent area 22. At 120, a composite laminate layer 32 is fabricated, typically by laying up multiple plies of a fiber reinforced polymer. The laminate layer 32 may or may not have materials and/or ply orientation sequences that are configured to aid in producing the control regions 36, 38, 40 previously discussed. In those applications where the edges (not shown) of the composite structure 24 has been scarfed or tapered around the inconsistent area 22, the laminate layer 32 may be formed so as to have a scarf or taper (not shown) that generally matches that of the edge of the inconsistent area 22. Next at 122, the adhesive and laminate layer 32 is placed over the inconsistent area 22 of the composite structure 24. At 124, a bonded joint is formed between the laminate layer 32 and the composite structure 24, by placing a tailored adhesive layer 34 between the laminate layer 32 and the composite structure 34. At 126, the bond joint 42 is divided into at least two regions respectively releasing strain energy at different rates. In one embodiment, the bond joint 42 is divided into three control regions 36, 38, 40 by tailoring the adhesive layer 34 in the manner previously described.

Figure 14:
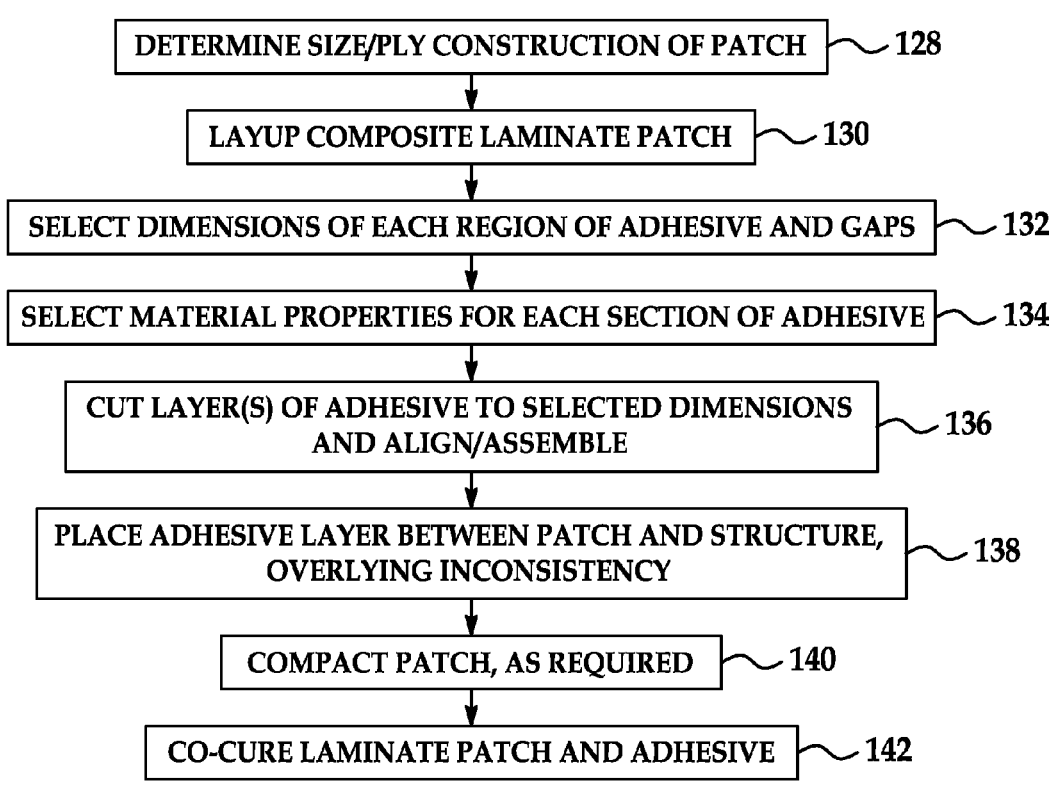
FIG. 14 is an illustration of a flow diagram showing additional details of the method shown in FIG. 13.

FIG. 14 illustrates further details of the method of reworking an inconsistent area 22 of a composite structure 24. Beginning at 128, the size and ply construction of a laminate layer 32 are determined, and at 130 the composite laminate layer 32 is laid up. As mentioned above, the laminate layer 32 may or may not have materials and/or ply orientation sequences that are configured to aid in producing the control regions 36, 38, 40. Thus, steps 128 and 130 may include selecting the thickness, and/or layup orientations of each ply 52 in the laminate layer 32, as well as the sequence of ply orientations within each of the control regions 36, 38, 40. In those applications where the edges (not shown) of the composite structure 24 may have been scarfed or tapered around the inconsistent area 22, the profile, slope, dimensions and/or direction of the corresponding scarf or taper on the laminate layer 32 may be determined as part of step 128. Also, although not shown in the drawings, the laminate layer 32 may include conductive plies (not shown) or plies containing conductive material (not shown) used for lightning strike protection. Next at 132, dimensions of each control regions 36, 38, 40 of the adhesive layer 34 are determined, along with any gaps "g" or fillers 50 that may be placed between the control regions 36, 38, 40. Next at 134, the material properties for each of the control regions 36, 38, 40 of the adhesive layer 34 are selected. At 136, sections 44-48 may be cut from a sheet of a structural adhesive having the selected dimensions, or formed from a paste.

At step 138, the sections adhesive 44-48 are aligned and assembled into an adhesive layer 34, and then placed between the laminate layer 32 and the composite structure 24, overlying the inconsistent area 22. The installed composite rework patch 30 may then be compacted, as required, at step 140. Finally, the compacted patch 32 and the adhesive layer 34 are co-cured at 142, thereby bonding the composite rework patch 30 to the composite structure 24.

Figure 15:
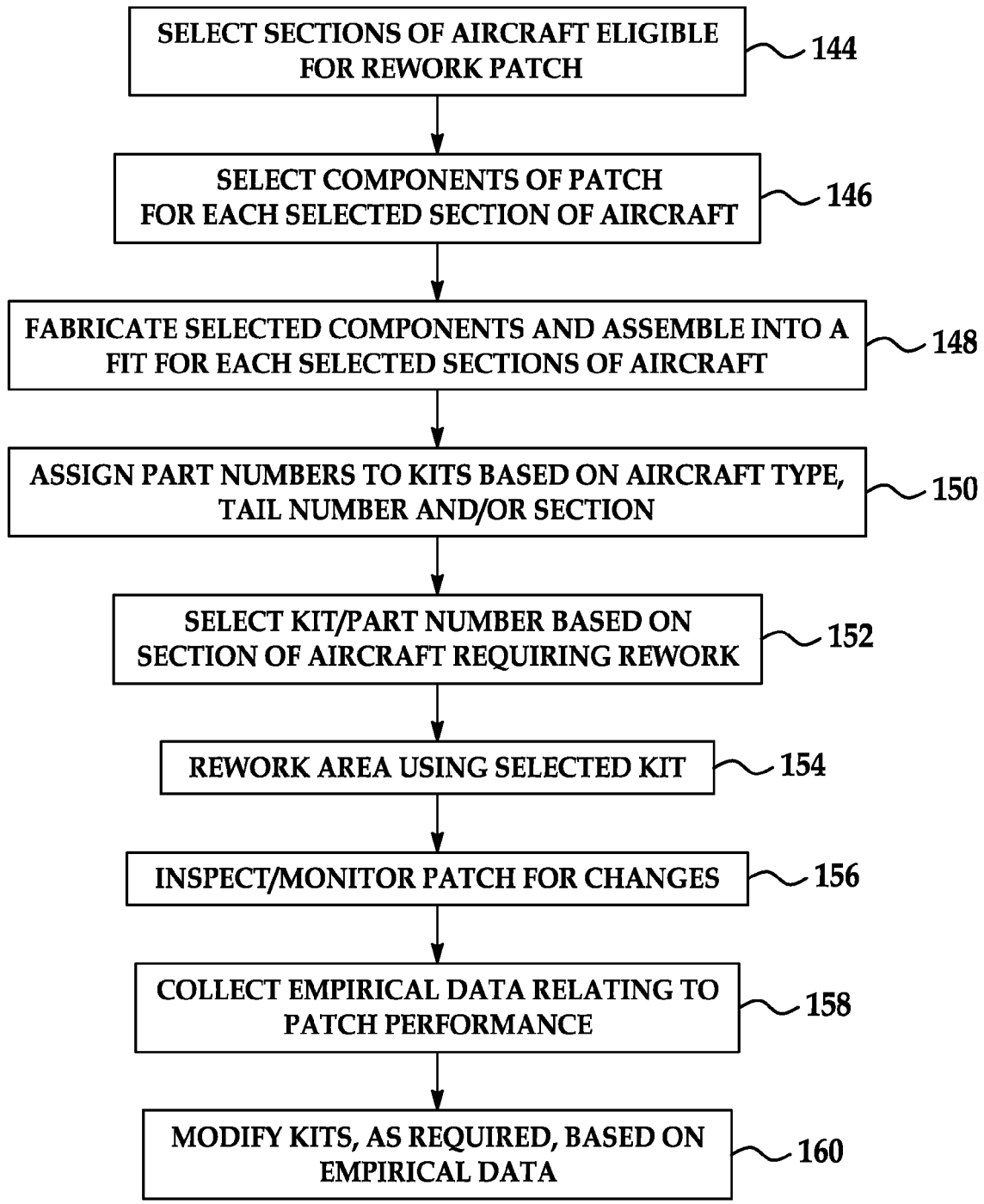
FIG. 15 is an illustration of a flow diagram of a method for reworking inconsistent areas of an aircraft using the kits shown in FIG. 11.

Attention is now directed to FIG. 15 which illustrates the steps of a method of reworking inconsistent areas in various sections of an aircraft using preassemble kits. Beginning at step 144, sections 92 of an aircraft 76 are selected that may be eligible for use of a composite rework patch 30 to rework an inconsistent area 22 within the section.

At 144, components of the rework patch 30 are selected for each selected section 92 of the aircraft. At 148, the selected components are fabricated and assembled into a kit for each of the selected sections 92 of the aircraft. The kits may include, without limitation, precut plies of prepreg or dry cloth that may be impregnated during installation of the composite rework patch 30. At 150, part or kit numbers 94 may be assigned to the kits based on the type of aircraft, tail number and/or section of the aircraft. Although not shown in the drawings, the kits may be stored in a controlled environment and monitored over time. At 152, a kit or part number 94 is selected based on the section 92 of the aircraft having an inconsistent area requiring rework. At 154 the inconsistent area 22 is reworked using the selected rework kit. The inconsistency having been reworked, then at 156, the installed composite rework patch 30 may be periodically inspected/monitored for potential changes. At 158, empirical data may be collected relating to the performance of composite rework patches 30 installed in various sections 92 of the aircraft in order to determine whether the components of the composite rework patch 30 may need to be altered, and to provide data that may be useful in certifying the patches. At 160, the rework patch kits may be modified as required, based on the accumulated empirical data.

Figure 16:
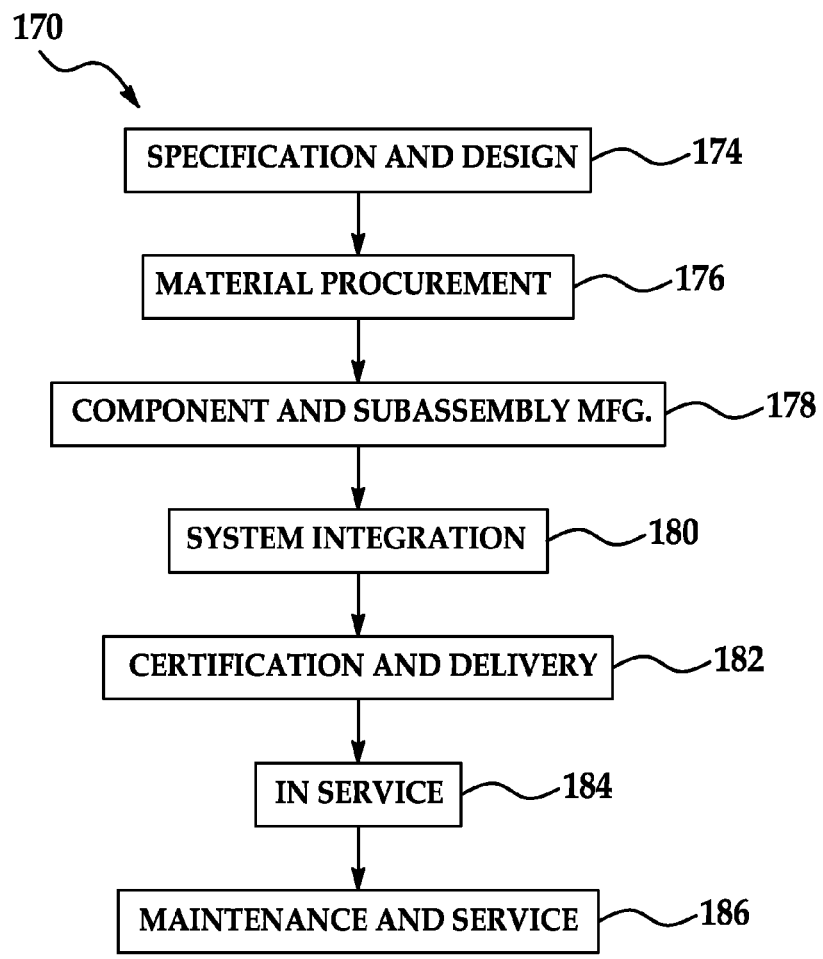
FIG. 16 is an illustration of a flow diagram of aircraft production and service methodology.
Figure 17:
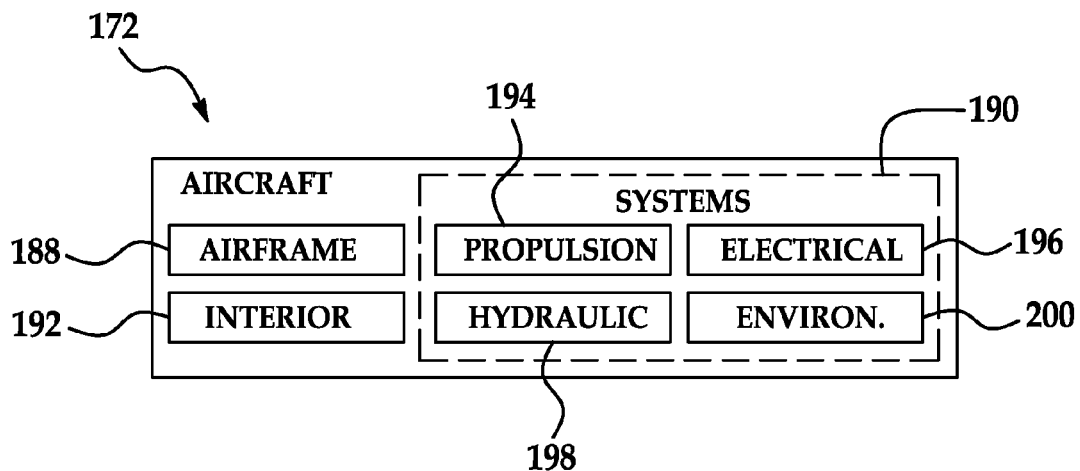
FIG. 17 is an illustration of a block diagram of an aircraft.

Embodiments of the disclosure may find use in a variety of potential applications, particularly in the transportation industry, including for example, aerospace, marine and automotive applications. Thus, referring now to FIGS. 16 and 17, embodiments of the disclosure may be used in the context of an aircraft manufacturing and service method 170 as shown in FIG. 16 and an aircraft 172 as shown in FIG. 17. During pre-production, exemplary method 170 may include specification and design 174 of the aircraft 172 and material procurement 176. The composite rework patches 30 may be specified and designed as part of the specification and design 174 of the aircraft 172, and procured as part of the procurement process 176. During production, component and subassembly manufacturing 178 and system integration 180 of the aircraft 172 takes place. The composite rework patches 30 may be used during production to rework inconsistencies that occur during the manufacturing 178 and/or system integration 180. Thereafter, the aircraft 172 may go through certification and delivery 182 in order to be placed in service 184. The composite rework patches 30 may be used to rework inconsistencies in order to achieve certification of the aircraft 172 and/or to satisfy delivery requirements. While in service by a customer, the aircraft 172 is scheduled for routine maintenance and service 186 (which may also include modification, reconfiguration, refurbishment, and so on). The composite rework patches 30 may be used while the aircraft 172 is in service to rework areas of the aircraft 172 that may develop inconsistencies while in service, and the condition of the patches 30 may be checked as part of a periodic maintenance routine.

Each of the processes of method 170 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 172 produced by exemplary method 170 may include an airframe 188 with a plurality of systems 190 and an interior 192. The composite rework patches 30 may be used to rework inconsistencies in the airframe 188. Examples of high-level systems 190 include one or more of a propulsion system 194, an electrical system 196, a hydraulic system 198, and an environmental system 200. Any number of other systems may be included. Although an aerospace example is shown, the principles of the disclosure may be applied to other industries, such as the marine and automotive industries.

Systems and methods embodied herein may be employed during any one or more of the stages of the production and service method 170. For example, components or subassemblies corresponding to production process 170 may be fabricated or manufactured in a manner similar to components or subassemblies produced while the aircraft 172 is in service. Also, one or more apparatus embodiments, method embodiments, or a combination thereof may be utilized during the production stages 178 and 180, for example, by substantially expediting assembly of or reducing the cost of an aircraft 182. Similarly, one or more of apparatus embodiments, method embodiments, or a combination thereof may be utilized while the aircraft 172 is in service, for example and without limitation, to maintenance and service 186.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of reworking an inconsistent area on a composite structure, comprising:

forming a composite laminate layer;
placing the laminate layer on a surface of the composite structure over the inconsistent area;
forming, using an adhesive, a bond joint between the laminate layer and the composite structure;
dividing the bond joint into at least two adhesive sections, the at least two adhesive sections configured to release strain energy respectively at different rates, by tailoring at least one of: a dimension of the adhesive, a form of the adhesive, and a structural property of the adhesive.

2. The method of claim 1, wherein placing the laminate layer includes:
aligning a first control region of the laminate layer over the inconsistent area, and
positioning a second control region of the laminate layer around the first control region.

3. The method of claim 1, wherein forming the bond joint includes:
placing a first adhesive section over the inconsistent area between the laminate layer and the composite structure, and
placing a second adhesive section around the first adhesive section between the laminate layer and the composite structure.

4. The method of claim 3, wherein forming the bond joint further includes forming a gap between the first adhesive section and the second adhesive section.

5. The method of claim 2, wherein forming the bond joint further includes:
placing a third adhesive section around a second adhesive section between the laminate layer and the composite structure.

6. The method of claim 3, wherein forming the bond joint includes:
arranging the second adhesive section and a third adhesive section in substantially concentric rings around the first adhesive section.

7. The method of claim 1, wherein forming the composite laminate layer includes:
laying up multiple plies of fiber reinforced polymer, and
tailoring a first characteristic of the plies for a first control region of the laminate layer, wherein the first characteristic influences a first strain energy release rate for the first control region of the laminate layer;
tailoring a second characteristic of the plies for a second control region, wherein the second characteristic influences a second strain energy release rate for the second control region of the laminate layer;
placing the first control region and the second control region to overlie a first adhesive section and a second adhesive section of the bond joint respectively.

8. The method of claim 1, further comprising:
reworking the inconsistent area to enable at least one of: a visual inspection, and a non-destructive inspection.

9. A method of reworking an inconsistent area on a composite aircraft structure, comprising:
fabricating a laminate layer;
fabricating a first adhesive section, a second adhesive section, and a third adhesive section of a structural adhesive;
placing the first adhesive section on a surface of the composite aircraft structure over the inconsistent area;
surrounding the first adhesive section with the second adhesive section;
surrounding the second adhesive section with the third adhesive section;
and,
using the first, second and third adhesive sections to form a bond joint between the laminate layer and the composite structure, wherein the bond joint is divided into three regions configured to release strain energy surrounding the inconsistent area respectively at different rates, by tailoring at least one of: a dimension of the structural adhesive, a form of the structural adhesive, and a structural property of the structural adhesive.

10. The method of claim 9, further comprising:
forming a gap, between the first adhesive section and the second adhesive section, configured to alter a mechanical property of the laminate layer.

11. The method of claim 9, further comprising:
forming a gap, between the second section of adhesive and the third adhesive section, configured to alter a mechanical property of the laminate layer.

12. The method of claim 9, further comprising:
configuring the first, second and third adhesive sections to reveal at least one of: a disbond initiation, and a disbond growth, using at least one of: a visual inspection, and a non-destructive inspection.

13. A method of reworking an inconsistent area on a composite aircraft structure, comprising:
fabricating a composite laminate layer;
fabricating a first adhesive section, a second adhesive section, and a third adhesive section of a structural adhesive;
placing the first adhesive section on a surface of the composite aircraft structure over the inconsistent area;
surrounding the first adhesive section with the second adhesive section;
surrounding the second adhesive section with the third adhesive section;
using the first, second and third adhesive sections to form a bond joint between the composite laminate layer and the composite structure, wherein the bond joint is divided into three control regions; and
configuring the three control regions to release strain energy surrounding the inconsistent area respectively at different rates, by tailoring at least one of: a dimension, a form, and a structural property of the structural adhesive, such that: a first control region is configured to provide favorable in-plane stresses that may suppress a stress concentration around a boundary of a disbond of the bond joint; a second control region is configured to release strain energy at a rate greater than a strain energy release rate of the first control region; and a third control region is configured to release strain energy at a rate greater than a strain energy release rate of the second control region.

14. The method of claim 13, wherein the first control region corresponds with the first adhesive section, the second control region corresponds with the second adhesive section, and the third control region corresponds with the third adhesive section.

15. The method of claim 13, wherein the first control region corresponds with the third adhesive section, the second control region corresponds with the second adhesive section, and the third control region corresponds with the first adhesive section.

16. The method of claim 13, wherein a global adhesive stress within the first control region reduces a strain energy release rate necessary for extension of a disbond under maximum load limits applied to the composite aircraft structure.

17. The method of claim 13, wherein a disbond in the second control region is configured to enable prediction, using a fatigue durability disbond curve, of a work input required to initiate growth of the disbond.

18. The method of claim 13, wherein the third control region is configured with a strain energy release rate that discourages: disbond initiation and growth, in-plane shear, and in-plane peeling moments.

19. The method of claim 13, further comprising:
configuring the three control regions to reveal at least one of: a disbond initiation, and a disbond growth, using at least one of: a visual inspection, and a non-destructive inspection.

* * * * *